UNITED STATES PATENT OFFICE.

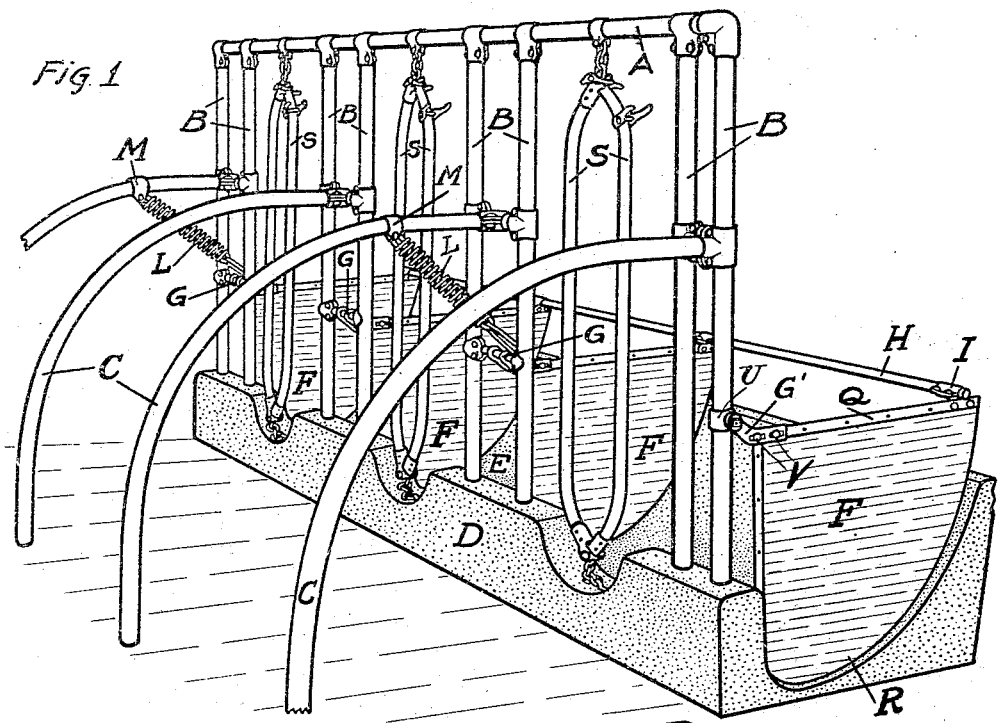
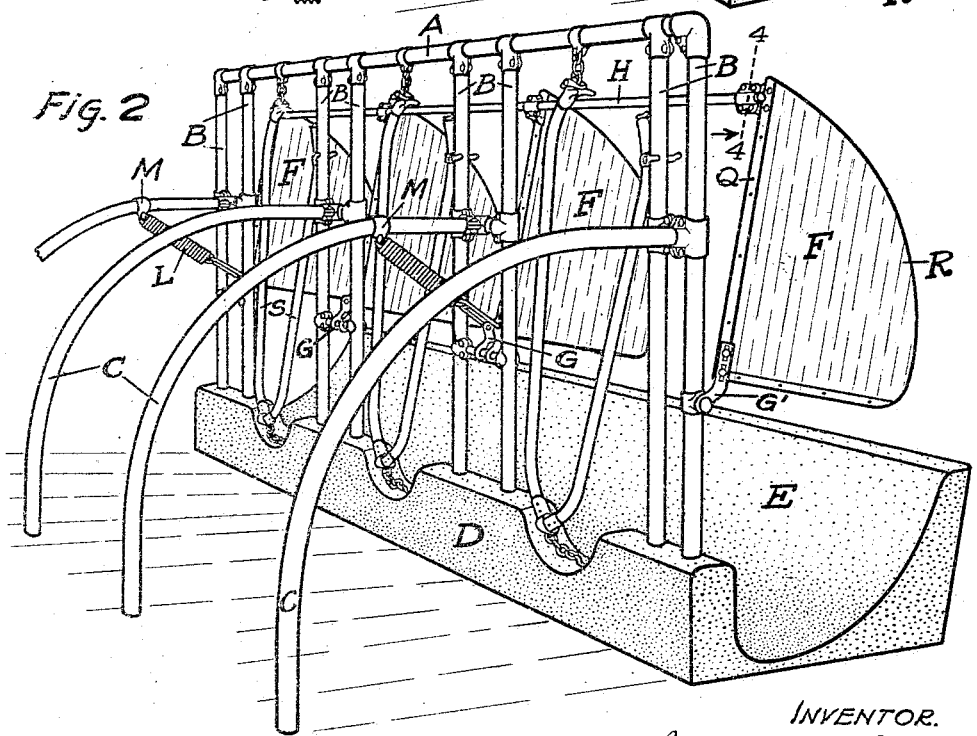

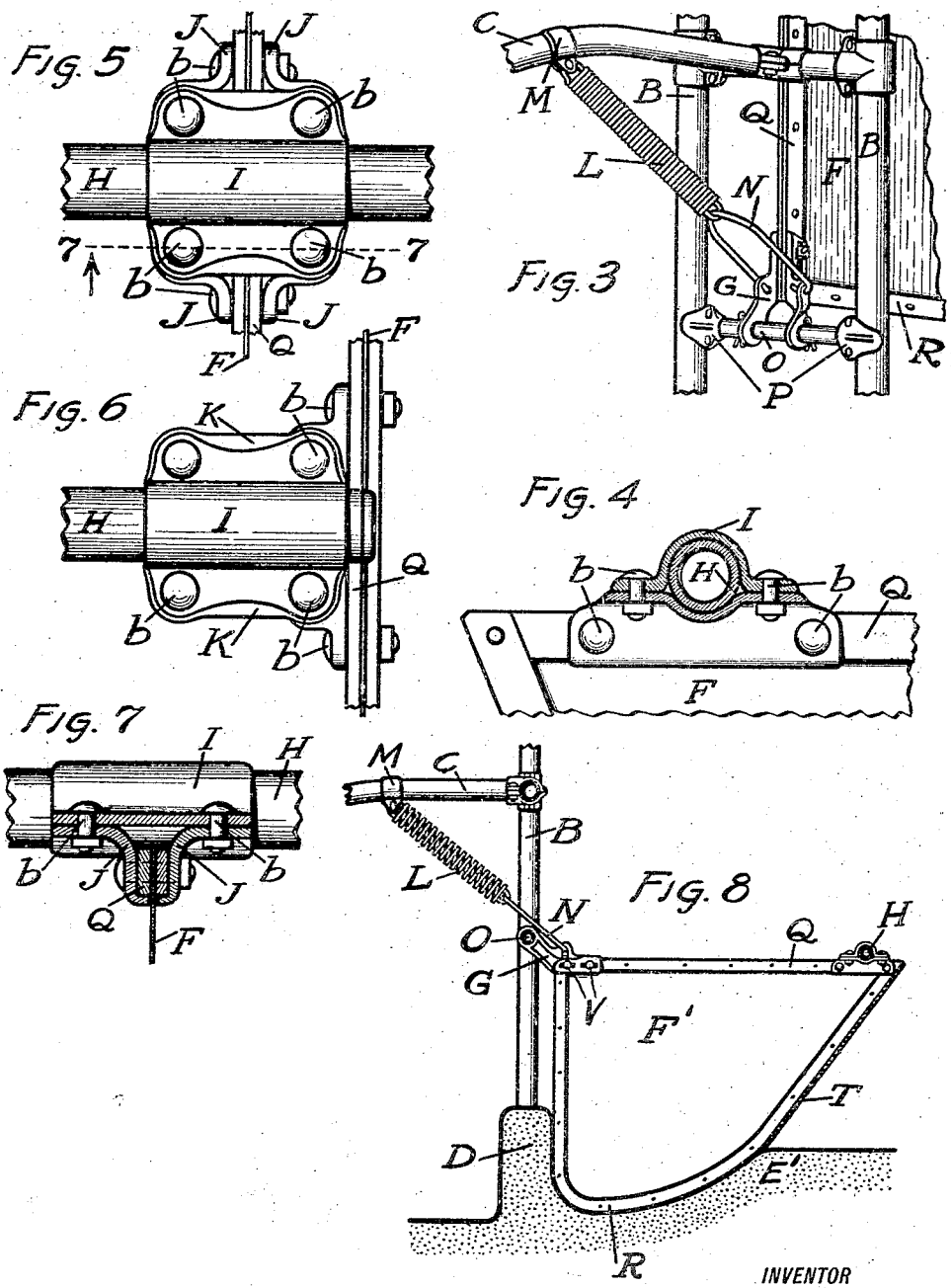

WILLIAM LOUDEN, OF FAIRFIELD, IOWA.

MANGER FOR ANIMAL-STALLS.

1,294,366.     Specification of Letters Patent.     Patented Feb. 11, 1919.

Continuation of application Serial No. 787,908, filed September 3, 1913. This application filed May 22, 1916. Serial No. 99,205.

*To all whom it may concern:*

Be it known that I, WILLIAM LOUDEN, a citizen of the United States, residing at Fairfield, in the county of Jefferson and State of Iowa, have invented new and useful Improvements in Mangers for Animal-Stalls, of which the following is a full, clear, concise, and exact description, reference being had to the accompanying drawing, forming a part of this specification.

My invention relates principally to stalls for cattle, and more particularly to the manger for said stalls having a movable part or parts pivoted to the stall frame, and it consists of an improvement whereby said movable manger member or members will be more easily raised and lowered and will be more readily and securely held in elevated position to permit of cleaning the manger and for other purposes; also, of other features hereinafter set forth.

In the accompanying drawings, Figure 1 is a perspective view of a series of cattle stalls having an elongated manger portion and a series of movable manger members pivoted to the stall frames,—the construction shown embodying my invention. Fig. 2 is a similar view showing the pivoted manger members in elevated position. Fig. 3 is an enlarged perspective view of a portion of Fig. 2, showing the preferred plan of connecting the pivoted manger member to the stall frame and a portion of the manger member in elevated position. Fig. 4 is an enlarged transverse section on line 4—4 of Fig. 2, looking in the direction of the arrow. Figs. 5 and 6 are enlarged plan views of clamp castings which are used to join the outer ends of the series of pivoted manger members to a brace rod, whereby their outer ends may all be braced together and they may be raised and lowered at one operation. Fig. 7 is a sectional view on line 7—7 of Fig. 5, looking in the direction of the arrow. Fig. 8 is a transverse section showing another form of the pivoted manger member.

This application is a continuation of a former application filed by me September 3d, 1913, (Serial Number 787,908,) for "cattle stalls."

Referring to the drawings, A represents the top-rail of a row of cow stalls, B the stall posts, and C the stall partitions between which the cows are held by stanchions S connected to the top-rail A and anchored to the manger curb D, all in the usual manner. In the form shown by Figs. 1 and 2, E represents a laterally extended or elongated manger, which is preferably made of concrete with its interior portion rounded and its outer edge raised as shown in Figs. 1 and 2, so as to prevent the feed which may be placed therein from being pushed beyond the reach of the cow.

In this form, to prevent one cow from getting the feed which belongs to another, or in any way interfering with or contaminating her neighbor's portion of the manger, division members F are used to separate the manger into compartments. These division members are preferably made of sheet metal having their lower edges rounded to fit the contour of the interior of the permanent portion of the manger, and are pivoted at their upper inner corners to the stall frame by hinge members G and G'. The inner ends of these division members are preferably kept separate and are provided with individual hinges while their outer ends are connected together so as to brace them against lateral displacement, and also to join a number of the members together, whereby the entire series thus joined together may be raised and lowered on their pivots in unison and by a single operation, instead of only one at a time,— the raising of the members being necessary prior to cleaning the manger and for other purposes.

For this purpose I use a brace H, preferably a rod formed of a piece of metallic tubing, long enough to reach the full length of the manger section and to connect together all the separate members in the section. The brace rod is placed on the upper edges of the members near their outer ends and is connected thereto by clamp castings I, J and K, which are held in engagement with the brace rod and the upper edges of the members F by the bolts b. The castings which are clamped on the outer or upper side of the brace rod are represented by I, while J represents the castings which are clamped against the inner or under side of the brace rod and against the opposite sides of the intermediate division members in the section, and K the castings which are clamped against the under side of the brace rod and against the inner sides of the members at the ends of the section.

The faces of the castings J and K which are placed against the sides of the members F and against the under side of the brace rod H are set at substantially right angles to each other. The castings J which are placed against the opposite sides of the division members are made short so that the bolt holes in their upper edges will correspond with the holes in the casting I when its center is placed directly over the division member F. The part K is made long enough for the bolt holes in its upper edges to correspond with the holes in the part I when both parts are placed on the same side of the end member F.

By this arrangement the part I will fit two of the parts J set on opposite sides of a division member and one of the parts K when both are placed on the inner side of an end member. In this way the clamping parts will stand on both sides of the division members which will most completely brace them, but only on the inner sides of the end members, thus leaving the end members entirely smooth on their outer sides.

The manger members F have no frame surrounding them; they are entirely separate from each other with the exception of the brace-rod H near their outer upper ends. Arranged in this way, all the members in a section will be braced together and may all be raised and lowered by a single operation, while there will be nothing connected to the members which will interfere with the free ingress or egress into and out of the manger. A frame surrounding the members would be more or less of an interference and would be objectionable on this account.

In lifting the members F to permit of a cleaning of the manger or for other purposes, the operator takes hold of one of the members or of the brace-rod connecting the members together, and by lifting it vertically all the members connected thereto will be raised to elevated position at one operation, as will hereinafter appear. Figs. 1, and 2, show a section of four members F connected to the brace rod H, and sometimes five or more manger members are thus connected together. The lifting of all these members at one operation or in unison unaided by assisting means requires considerable strength and entails considerable labor.

To lessen this labor and to enable the operator to easily lift the members, I apply a metallic spring device, to one or more of the members F in such a way that it will provide auxiliary lifting means, which will automatically assist the operator in lifting the members into elevated position. As shown in Figs. 1, 2, 3 and 8, it is preferable to use for this purpose a helical tension-spring L, having one end connected to the pivot-corner of the member F in advance of, and, therefore, eccentrically with the pivot O, and its other end connected to a portion of the stall-frame or some other suitable fixed object. As shown in the drawings, the upper end of the spring is connected in this instance and for example to the horizontally disposed portion of the stall partition C preferably by means of an adjustable compression clip M, and its lower end is connected to an intermediate portion of the hinge member G by in this instance means of a draft link or clevis N. The spring, however, may be connected to any other suitable portion of the stall frame or fixed object suitably positioned for the purpose, and in any other suitable manner to the member F.

The hinge members may be made single, as shown by G′ at the end of the row of stalls, and be pivoted to a casting U applied to one of the stall posts; or they may be made double as shown by G in the intermediate portion of the row of stalls between the stanchion openings, and as most plainly shown in Fig. 3. When made double the pivoted ends of the hinges are preferably spread apart and may be arranged to straddle one of the small posts and connect with a pivot on each side, or when the hinge comes between two of the posts, it may be placed on a pivot rod O as most plainly shown in Fig. 3, this pivot rod being secured to the posts by means of adjustable clamps P. When the spring is connected to a double hinge member the double link or clevis N should be used as shown, but when connected to a single hinge member a single link with a hook at each end, or a half clevis, may be used.

The clip M being applied to the stall partition C some distance away from the stall posts B, to which the members F are either directly or indirectly pivoted, or to some other fixed and suitably located object at that side of the stall opposite which the division-members F are located and pivoted, the spring L will stand at an angle of approximately 45 degrees. This will bring the line of the tension of the spring approximately in the center of the division member when in its lowered position, which will balance it better than if this line was along one of its edges. When the division-members F are in their lowermost position, and, therefore, subdividing the manger, the helical springs L will be under their greatest tension. At the same time, the line of draft of these springs will have approached so nearly the pivot points of the division-members that the said springs may be said to be inactive; that is to say, incapable, when the springs are thus relatively positioned, of exerting sufficient lifting influence upon the division-members to overcome their combined weight. To elevate these division-members from the position in which they are illustrated in Fig. 1 to that in which they are illustrated in Fig. 2, it is first necessary to give or impart to the division-members a slight initial upward impulse, which may be conveniently accomplished through the medium of the rod H grasped at any convenient point by the operator. As the tension of the springs is sufficient to approximately counterbalance the combined weight of the several division-members employed and their appurtenances, practically no further effort will be required of the operator during the lifting operation. As the lifting proceeds the leverage of the springs will be increased faster than their lifting tension is decreased, until a point is reached when the lifting tension of the springs will balance and will finally overcome the weight of the manger members and they will be held in elevated position by the tension of the springs alone, as shown by Figs. 2 and 3.

The variable leverage of the springs counteracting or equalizing to a certain extent their lifting tension, as it does, makes it practical to secure a well poised balance between the weight of the hinged manger members and the lifting tension of the springs as soon as the manger members have been lifted by the operator to a point approximately half way up. When lifted to this extent the increase of their leverage will enable the lifting tension of the springs to balance the weight of the manger members and the brace-rod connected to them and they will stand in this partly raised position, when a slight initial impulse either upward or downward will cause them to assume the fully raised or fully lowered position. The decreasing tension of the springs will also prevent the manger division-member from being moved too suddenly into elevated position.

To secure the most perfect balance the springs should be made heavier or lighter and be properly adjusted to correspond with the weight of the manger division-members and their appurtenances. To accomplish this adjustment the compression clips M may be moved back or forth along the stall partition C. The link N may also be made longer or shorter which will necessitate the setting of the clip M at different points along the horizontally disposed partition member C. This will change the position of the springs from 45 degrees to a position more or less horizontal or vertical. The longer the link the more nearly horizontal will be the position of the spring and the less leverage and lifting power it will have. On the other hand, the shorter the link the more nearly vertical the position of the spring will be and the more leverage and lifting power it will have, provided the size and adjustment of the spring is the same in both cases. By interposing the link between the spring and hinge member, the line of tension of the spring may also be brought closer to the pivot than would be the case if the spring were connected directly to the hinge member.

The longer the link is made the closer it will come to the pivot center of the hinge, and if made long enough the link may have to be slightly bent to pass over the pivot pin O and permit the spring to stand more closely in line with the center of the pivot. It is not necessary or desirable that a spring should pass the center of the pivot so that the draft will be downwardly instead of upwardly on the hinged manger members. This would make them harder to lift, and it is not needed to hold them down, The weight of the members will be sufficient for this purpose and also to overcome a slight lifting power of the springs, so that the springs are, for the time being, inactive.

In the drawings four manger members F are shown and only two auxiliary lifting springs L. This will be sufficient because the members are all connected together near their outer ends by the brace rod H. Two springs will be sufficient for five or more members provided the strength and adjustment of the springs are properly proportioned to correspond with the weight and position of the members. In case a single manger compartment is used having two end members F connected together, one spring applied to one of the members will usually be sufficient. However, if desired, a lighter spring may be applied to each of the members. Even in that case the brace rod H will be beneficial because it will tie the outer ends of the members together and will enable the operator to raise or lower both members at one operation.

The springs or other auxiliary lifting means employed are not intended as a sole means for lifting the manger parts, such as a windlass or similar means used for this purpose. They are designed to assist the operator not only in raising but also in lowering the manger members. They are intended to carry a variable portion of the weight but not all of it, except when the members are fully elevated.

By this arrangement, the means to assist the operator in raising and lowering the manger members will be self-contained within the stall frame and will not require any overhead or extraneous support, as would be required if the counterweights were used for this purpose. Also, it would be impossible to obtain the same degree of efficiency with counterweights, and the arrangement would be more expensive.

The members F are preferably fitted on their upper edges with binding strips Q to which the hinge members G and G' and the brace rod clamps J and K are connected. They are also fitted with binding strips R on their lower edges. It is preferable that the manger members be made high enough to prevent the animals in the stalls from reaching over them. Also, that they be pivoted to the stall frame a considerable distance above the curb D, so that when the members are raised on their pivots they will stand a considerable distance about the mangers.

In addition to this, it is also preferable that the curb be provided with cut-outs or depressions where the stanchions S are anchored, to provide throat room for the animal when lying down. In view of these requirements I have discarded the connections sometimes used between the hinged ends of the manger divisions, the brace rod H at the other ends of the members being sufficient to rigidly connect them together.

Fig. 8 shows another form of the movable manger parts. The bottom or permanent part of the manger E' is made shallower, and a metallic back sheet T is secured to the outer edge of the members F' to take the place of the raised concrete edge of the part E shown in Figs. 1 and 2. By extending the back T down farther than shown in Fig. 8, the permanent raised portion of the manger E may be made still lower or entirely discarded. The brace rod H clamped to the upper edges of the members F' is also used in this modification. It adds strength to the structure, is handy for the operator to catch hold of at any convenient point in lifting the manger members and will assist in preventing the cow from tossing hay over the back of the manger.

When the spring is constructed as shown in Fig. 9, a catch or some similar device known to the art should be used to connect the manger member to the stall frame when it is in elevated position, and to hold it in that position. It will be understood by those skilled in the art that the manger members and their connections are simply an attachment for the stalls, and being separable from them, they may be left off if not needed, or may be added at any time.

The entire construction is simple, easily handled and easy to keep clean, besides being durable and effective in operation.

What I claim is:

1. The combination with a stationary stall-frame provided with manger-openings, and a feed-trough positioned transverse of and at one side of said frame and openings, of manger division-members connected together, pivoted near their upper inner corners to the stall-frame intermediate the manger-openings, and located in and serving to subdivide the feed-trough into compartments coincident with manger-openings, and springs connected at one of their ends to the manger division-members at one side of the pivot-points between the same and stall-frame, and at their opposite ends to a fixed part of the stall-frame at the opposite side thereof at which the manger division-members are located, said springs being so disposed with the pivot-points of the manger division-members as not to raise them when the latter are in their lowermost position and to assist in raising said manger division-members only subsequent to an initial upward impulse given said members.

2. The combination with a stationary stall-frame, provided with manger-openings, and a feed-trough located at one side of the frame transverse said opening, and provided with manger division-members connected together to move in unison, said members being pivoted at their upper inner corners to the stall-frame intermediate the manger-openings and located in and serving to subdivide the feed-trough, of helical springs connected at one of their ends to a fixed part of the stall-frame at that side of the same opposite which the manger division-members are located and pivoted and at points above the pivots of the manger division members, and at their opposite ends loosely connected to the manger division-members at one side of the pivots thereof, such springs being so disposed with relation to said pivots as not to materially assist in raising the manger division-members when the same are in their lowermost position and to assist in elevating the members only subsequent to an initial upward impulse given said members.

3. The combination with a stationary stall-frame, provided at intervals with manger-openings, and a feed-trough transverse the openings at one side thereof, of manger division-members adapted to move in unison, pivoted at their upper inner corners to the stall-frame intermediate the manger-openings and located in and serving to subdivide the feed-trough, of helical lifting-springs connected at one of their ends to the manger division-members at one side of the pivots of the latter and at their opposite ends to fixed parts of the stall-frame at that side thereof opposite which the manger division-members are located and at points above said pivots, said springs being so disposed with regard to said pivots that their lines of draft pass close to said pivots and the springs do not raise the manger division-members when the manger division-members are lowered and assist in such raising only subsequent to an initial upward impulse given said members.

4. The combination with a stationary stall-frame having a manger-opening, and a feed-trough adjacent said opening, of a pair of manger division-members connected to move in unison, said members being pivoted at their inner edges to the stall-frame at opposite sides of the manger-opening therein, and a lift-spring having one end connected to one of the division-members at one side of the pivot thereof, and at its opposite end connected to a fixed adjacent object, the two points of connection of said spring being so related to the said pivots of the division-members as to pass close to the same when the division members are lowered and therefore not raise the same and to recede from such pivots and assist in raising the division-members subsequent to an initial upward impulse imparted to said division-members.

5. The combination with a stationary stall-frame provided with manger-openings, and a feed-trough transverse the openings at one side of the frame, of manger division-members connected to raise and lower in unison and pivoted at their inner upper corners to the stall-frame between the manger-openings and located in and serving to subdivide the feed-trough, of lifting-springs connected at one of their ends to the stall-frame, and draft-devices connected at one of their ends to the remaining ends of the lifting-springs and at their opposite ends pivotally connected to the manger division-members at one side of the pivots thereof, said draft-devices being so disposed as to their opposite points of connection with relation to the pivots of the manger division-members as to pass close to said pivots and incapable of assisting in raising said members when the latter are lowered and to assist in raising them only subsequent to an initial upward impulse given said members.

6. The combination with a stationary stall-frame provided at intervals with manger-openings, and a feed-trough transverse the openings, of division-members for the feed-trough pivoted at their upper inner corners to the stall-frame between the manger-openings, of lifting-springs connected at one of their ends to a fixed object at that side of the stall-frame opposite which the feed-trough and division-members are located, and draft-devices connected to the remaining ends of the springs, passed through the stall-frame, and at their opposite ends pivoted to the division-members at one side of the pivots of the members, said draft-devices being so disposed with relation to the pivots of the members as to pass close to the same and be incapable of assisting in raising the members when the latter are lowered and to recede from such points and assist in raising the members only subsequent to an initial upward impulse imparted to such members.

7. An animal-stall having a frame, a manger-member pivoted to a portion of the frame and constructed to be manually raised and lowered on its pivot, a clip adjustable along a portion of the frame, and a spring having one end connected to the manger-member and the other end connected to said clip, whereby the adjustment of the clip will vary the tension of the spring to correspond with the weight of the manger-member.

8. An animal-stall having a frame, a manger-member pivoted to a portion of the frame and constructed to be manually raised and lowered on its pivots, a horizontally extending partition-member on the opposite side of the stall-frame from the manger-member, and a helical spring tensioned to act as auxiliary lifting means connected at one end to the manger-member and at the other end adjustably secured to the horizontally disposed partition-member, the pivot of said manger-member and the ends of the spring being so located that the spring will be held in a position approximating 45 degrees and its line of tension will come approximately in the central portion of the manger-member when in its lowered position.

9. In a device of the character described, a series of hinged members dividing a manger into compartments, a brace-rod extending along the outer ends of said series of members, outer and inner clamping-members connecting the brace-rod and the division-members together, the inner clamp-member secured to the inner edges of the end division-members being approximately the same length as the outer clamp-members, and the inner clamp-members applied to the opposite edges of the central division-members being approximately half that length, whereby one size of the outer clamp-member will match both sizes of the inner clamp-members.

10. The combination with animal-stalls having an elongated manger-portion connected therewith, said stalls being provided with openings for giving access to the manger, of a series of separate manger division-members, each pivoted near its inner end to a portion of the stall-frame, said members being adapted when lowered to subdivide the manger into individual compartments coincident with said openings, and a rod extending across and connected adjacent the free ends of the said members, said rod being adapted to serve as a handhold for raising and lowering the members on their pivots and as a brace against lateral displacement of the members.

11. The combination with animal-stalls having an elongated manger-portion connected therewith, said stalls being provided with openings for giving access to the manger, of a series of separate manger division-members, each pivoted near its inner end to a portion of the stall-frame, said members being adapted when lowered to subdivide the manger into individual compartments coincident with said openings, a brace-rod extending across and adjacent the free ends of the division members, and upper and lower clamp-members embracing the brace-rod, the lower clamping-members being secured to the manger division-members, whereby said latter members are braced against lateral displacement and the brace-rod is adapted to serve as a hand-hold for raising and lowering said members on their pivots.

12. The combination with a stall-frame and an adjacent manger, of a manger division-member, an elongated lateral pivot-member secured to the stall-frame, and a hinge-member comprising opposite plates having one of their ends secured to the opposite sides of the division-member and their remaining ends diverged and loosely mounted on the elongated pivot-member.

13. The combination with a stall-frame comprising spaced-apart vertical posts and an adjacent trough-like manger, of a pivot-member horizontally supported between and by said posts, and a manger division-member loosely mounted at its inner end on said pivot-member.

14. The combination with an elongated manger-trough, and a stall-frame comprising a partition extending along one side of said manger-trough and provided with an opening giving access to the trough, a manger division-member for subdividing the trough, a hinge-member secured to the manger division-member and pivoted at its opposite end to the partition, and a spring actuated clevis straddling the hinge and secured to the division-member and adapted to assist in raising the same.

In witness whereof, I have hereunto subscribed my name.

WILLIAM LOUDEN.

Copies of this patent may be obtained for five cents each, by addressing the "Commissioner of Patents, Washington, D. C."